J. WILLIS.
Sled Brake.
No. 84,979.
Patented Dec. 15, 1868.
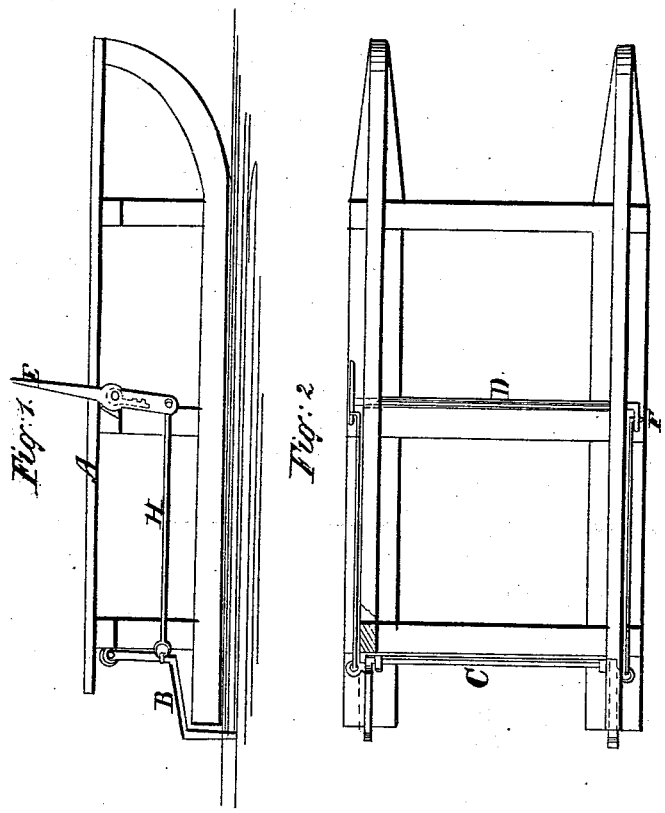

JAMES WILLIS, OF MIFFLIN, WISCONSIN.

Letters Patent No. 84,979, dated December 15, 1868.

IMPROVEMENT IN SLED-BRAKES.

The Schedule referred to in these Letters Patent and making part of the same.

*To all whom it may concern:*

Be it known that I, JAMES WILLIS, of Mifflin, in the county of Iowa, and State of Wisconsin, have invented a new and improved Sled-Brake; and I do hereby declare that the following is a full, clear, and exact description thereof, which will enable others skilled in the art to make and use the same, reference being had to the accompanying drawings, forming part of this specification.

The object of this invention is to provide a simple and efficient brake for sleds.

It consists of the arrangement of the several parts, as hereinafter fully described.

Figure 1 represents a side elevation of a sled having my improved brake attached.

Figure 2 represents a plan view of the bottom of the same, with a part broken away.

Similar letters of reference indicate corresponding parts.

A represents a sled, which is provided with the bent dogs B, suspended from a rock-shaft, C, which is suspended in bearings, in the rear side of the hind beam, so that the dogs will bear on the track, behind the runner.

D represents another rock-shaft, suspended in bearings from the middle or front beam, and which is provided with a hand-lever, E, at one end, and a crank, F, at the other, from which connecting-rods, H, extend to and are connected with the dogs B, whereby they are brought into contact with the ground when power is applied to the hand-lever E.

Hand-levers may also be applied at both sides, if preferred, and instead of suspending the dogs at the hind side of the rear beam, they may be suspended from any other beam, and arranged to bear on the ground inside of the runners.

The connecting-rods and levers may also be arranged inside of the raves and posts of the sled.

I am aware that single brakes have been arranged on one side of a sled, in some respects similar to my improvement, but these are objectionable, as they produce side draught, and even if they are arranged on both sides, without being connected together, it would be more difficult to operate them, and the operation would not be equal on both sides, and such arrangement I do not claim.

Having thus described my invention,

What I claim as new, and desire to secure by Letters Patent, is—

The brakes B, formed upon the ends of the shaft C, arranged at the rear of both runners, and connected upon both sides of the sled to the transverse crank-shaft D, by means of the connecting-rods H H, all operating as described, for the purpose specified.

JAMES WILLIS.

Witnesses:
PHILLIP ALLEN,
JAMES BREWER.